US011360227B2

(12) United States Patent
Roure (10) Patent No.: US 11,360,227 B2
(45) Date of Patent: Jun. 14, 2022

(54) CHARACTERIZING FRACTURE ORIENTATIONS IN ORTHORHOMBIC ADJACENT LAYERS USING THE PHASE OF AZIMUTHAL FOURIER COEFFICIENTS

(71) Applicant: CGG SERVICES SAS, Massy (FR)

(72) Inventor: Benjamin Roure, Moigny-sur-Ecole (FR)

(73) Assignee: CGG SERVICES SAS, Massy (FR)

( * ) Notice: Subject to any disclaimer, the term of this patent is extended or adjusted under 35 U.S.C. 154(b) by 15 days.

(21) Appl. No.: 16/927,364

(22) Filed: Jul. 13, 2020

(65) Prior Publication Data

US 2021/0356614 A1    Nov. 18, 2021

Related U.S. Application Data

(60) Provisional application No. 63/025,299, filed on May 15, 2020.

(51) Int. Cl.
  *G01V 1/30* (2006.01)
  *G06F 17/14* (2006.01)

(52) U.S. Cl.
  CPC .............. *G01V 1/301* (2013.01); *G06F 17/14* (2013.01); *G01V 2210/646* (2013.01); *G01V 2210/70* (2013.01)

(58) Field of Classification Search
  None
  See application file for complete search history.

(56) References Cited

U.S. PATENT DOCUMENTS

| 10,379,243 | B2 | 8/2019 | Roure | |
| 2017/0102471 | A1* | 4/2017 | Roure | G01V 1/306 |
| 2018/0203145 | A1* | 7/2018 | Quevedo | G01V 1/362 |

FOREIGN PATENT DOCUMENTS

EP    3182165 A1    6/2017

OTHER PUBLICATIONS

Barone et al., "A new Fourier azimuthal amplitude variation fracture characterization method: Case study in the Haynesville Shale" Geophysics, vol. 83, No. 1 (Jan.-Feb. 2018) (Year: 2018).*
Benjamin Roure, "Detecting fracture orientation misalignment between two orthorhombic media using the phase of azimuthal Fourier coefficients," CGG, Jun. 2020, pp. 1-115.

(Continued)

*Primary Examiner* — John C Kuan
(74) *Attorney, Agent, or Firm* — Patent Portfolio Builders PLLC (57) ABSTRACT

Methods and apparatuses characterize fracture orientations in orthorhombic adjacent layer. Seismic data with azimuthal coverage enables calculating Fourier coefficients of reflectivity at an interface between the orthorhombic adjacent layers. The phases of $2^{nd}$ and $4^{th}$ FCs may be used to infer the fracture orientations in the orthorhombic adjacent layers. Analysis of $2^{nd}$ and $4^{th}$ Fourier coefficients' phases for different incidence angles may indicate that the fracture orientations in the orthorhombic adjacent layers are aligned, orthogonal, at 45°, that one of the layers is isotropic, etc.

8 Claims, 9 Drawing Sheets

(56) References Cited

OTHER PUBLICATIONS

Colin M. Sayers et al., "Azimuth-dependent AVO in reservoirs containing non-orthogonal fracture sets," Geophysical Prospecting, 2001, pp. 100-106, vol. 49.

D. F. Winterstein, "Velocity anisotropy terminology for geophysicists," Geophysics, Aug. 1990, pp. 1070-1088, vol. 55. No. 8.

Ivan Pšenčik et al., "Polarization, phase velocity, and NMO velocity of qP-waves in arbitrary weakly anisotropic media," Geophysics, Sep.-Oct. 1998, pp. 1754-1766, vol. 63, No. 5.

Ivan Pšenčik et al., "Properties of Weak Contrast PP Reflection/Transmission Coefficients for Weakly Anisotropic Elastic Media#," Studia geoph. et geod., 2001, pp. 176-199, vol. 45.

Jon Downton et al., "Azimuthal Fourier Coefficients," CSEG Recorder Dec. 2011, pp. 22-36.

Jonathan E. Downton et al., "Interpreting azimuthal Fourier coefficients for anisotropic and fracture parameters," Interpretation. Aug. 2015, pp. ST9-ST27.

Luc T. Ikelle, "Amplitude variation with azimuths (AYAZ) inversion based on Linearized inversion of common azimuthal sections," SEG 1996 pp. 601-644.

Michael Schoenberg et al., "Orthorhombic media: Modeling elastic wave behavior in a vertically fractured earth," Geophysics, Nov.-Dec. 1997, pp. 1954-1974, vol. 62, No. 6.

Andreas Rüger, "Variation of P-wave reflectivity with offset and azimuth in anisotropic media," Geophysics, May-Jun. 1998, pp. 935-947, vol. 63, No. 3.

Extended European Search Report in corresponding/related European Application No. 21305495.0 dated Sep. 24, 2021.

Jon Downton et al., "Azimuthal Fourier coefficients: a simple method to estimate fracture parameters," GeoConvention 2012: Vision, May 14, 2012, pp. 1-9.

* cited by examiner

CHARACTERIZING FRACTURE ORIENTATIONS IN ORTHORHOMBIC ADJACENT LAYERS USING THE PHASE OF AZIMUTHAL FOURIER COEFFICIENTS

BACKGROUND

Technical Field

Embodiments of the subject matter disclosed herein generally relate to methods and systems for seismic exploration, and, in particular, to methods and systems for investigating fracture orientations in orthorhombic media/layers.

Discussion of the Background

Seismic exploration is frequently used in oil and gas exploration and recovery for locating hydrocarbon reservoirs and designing exploitation (drilling) plans. Analysis of seismic data obtained during seismic surveys provides valuable information about structure and physical parameters of subterranean rock formations. In a seismic survey, a source generates a seismic signal that propagates into the explored formation and is, at least partially, reflected at interfaces between a formation's layer having different acoustic impedances. The source typically generates compressional seismic signals, that is, pressure variations along the propagation direction (i.e., P-waves), but both P-waves and S-waves (i.e., shear/secondary waves) may be generated at layer interfaces. Seismic detectors record seismic data which may represent both P- and S-waves.

The recorded seismic data includes a convolution of the source wavelet (i.e., the signal's signature) and the formation's response function. Seismic data processing aims to extract the formation's response function, and various parameters related to the explored formation. One way of expressing the response function is by using reflectivity, R, which for detected P-waves is $R_{pp}$. Reflectivity depends on the incidence angle, $\theta$, (which is defined in a vertical plane) and the azimuth angle, $\phi$ (which is defined in a horizontal plane). Reflectivity characterizes subterranean properties and can serve as input to other inversion algorithms. For example, reflectivity can provide useful information regarding the anisotropy parameters of the subterranean formation, such as subsurface fractures. These anisotropy parameters may reveal shale plays, tight gas sands and coal bed methane, as well as carbonates in naturally fractured reservoirs. These characteristics and parameters are used to design and manage underground transportation systems, foundations of major structures, cavities for storage of liquids, gases or solids, etc.

In oil and gas exploration, this kind of information is used for determining optimal locations and orientations of wells (which may be vertical, inclined or deviated, and horizontal), to minimize wellbore instability and formation breakout. This information may also be used for stimulating the production of hydrocarbons by applying hydraulic pressure on the formation from the wellbore. Also, in geothermal exploration, such information is used to better determine location/orientation while tapping into geothermal resources. Another area where such information is usedful is in carbon capture and storage. The data inversions yield estimates of the elastic stiffnesses (velocities and anisotropic parameters) that can be used to predict lithology, porosity and the fluid content of the subsurface, as well as intensity and orientation of fractures in subterranean formations. This kind of information is important when designing drilling paths, particularly when fracking is used.

Figure 1:
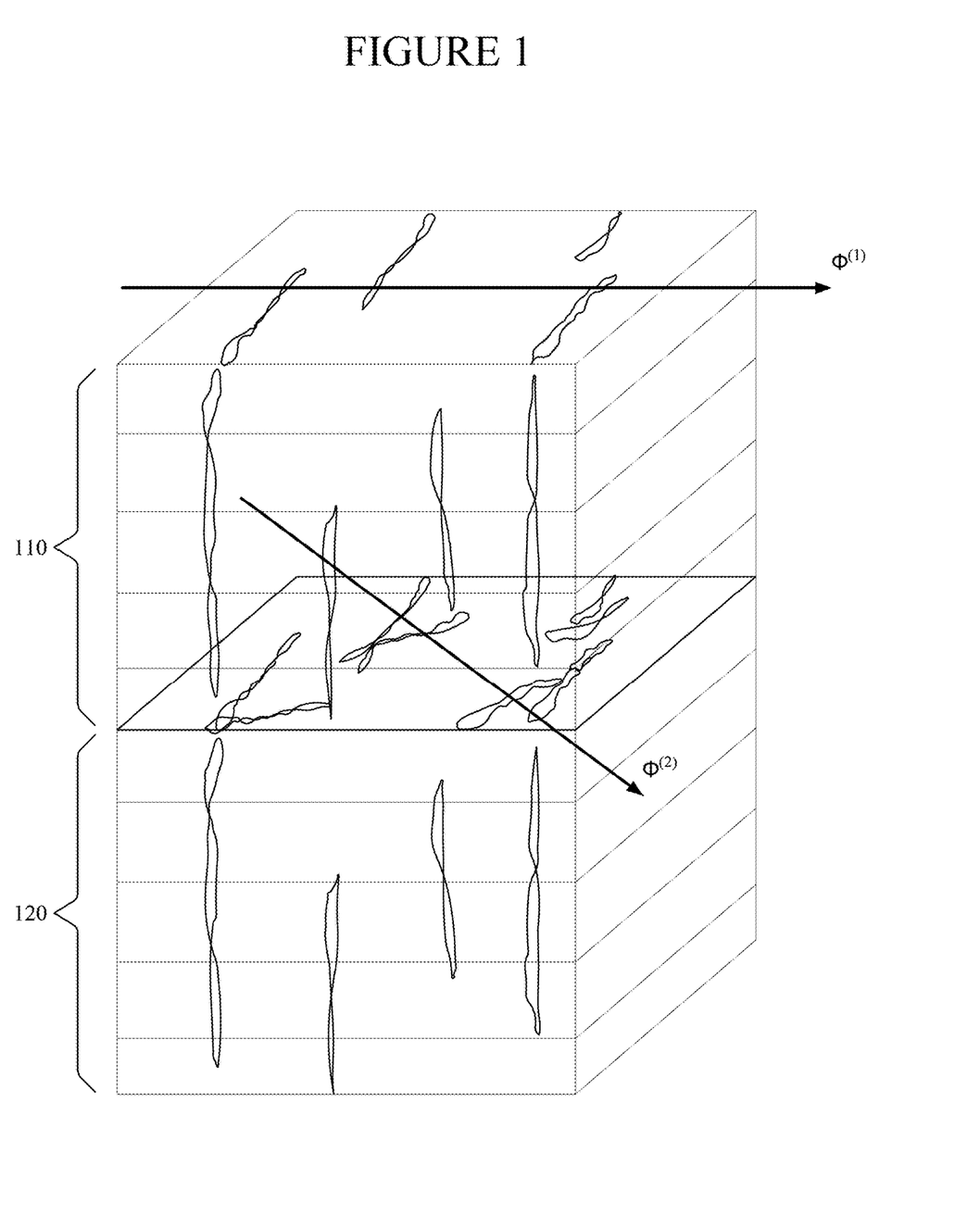
FIG. 1 shows two adjacent orthorhombic layers with different symmetry axes of the vertical fractures.

Anisotropy in orthorhombic layers (or media) is frequently due to vertical fractures parallel to one direction and, thus, perpendicular to a symmetry axis and horizontal fine layering as illustrated in FIG. 1. Adjacent layers (e.g., 110 and 120) generally have different symmetry axes, e.g., $\phi^{(1)}$ and $\phi^{(2)}$ drawn on respective layer's top surface in FIG. 1.

It is desirable to determine the fractures' orientation from seismic data in order to better design drilling paths and/or determine locations of fracking stages.

SUMMARY

Methods and devices according to various embodiments determine fracture orientation from seismic data using the phases of azimuthal Fourier coefficients (FCs).

According to an embodiment, there is a seismic exploration method characterizing fracture orientations in orthorhombic adjacent layers. The method includes obtaining seismic data with azimuthal coverage enabling calculating azimuthal FCs of reflectivity at an interface between the orthorhombic adjacent layers, calculating phases of $2^{nd}$ and $4^{th}$ azimuthal FCs for different incidence angles, and characterizing the fracture orientations in the orthorhombic adjacent layers based on the phases of $2^{nd}$ and $4^{th}$ azimuthal FCs, for a drilling and/or fracking plan.

According to another embodiment, there is a seismic data processing apparatus including an interface and a data processing unit connected to the interface. The interface is configured to obtain seismic data with azimuthal coverage enabling calculating azimuthal FCs of reflectivity at an interface between the orthorhombic adjacent layers. The data processing unit is configured to calculate phases of $2^{nd}$ and $4^{th}$ azimuthal FCs for different incidence angles, and to characterize the fracture orientations in the orthorhombic adjacent layers based on the phases of $2^{nd}$ and $4^{th}$ azimuthal FCs, for a drilling and/or fracking plan.

According to yet another embodiment, there is a computer-readable recording medium non-transitorily storing executable codes which, when executed by a computer, make the computer perform a seismic exploration method. The method includes obtaining seismic data with azimuthal coverage enabling calculating azimuthal FCs of reflectivity at an interface between the orthorhombic adjacent layers, calculating phases of $2^{nd}$ and $4^{th}$ azimuthal FCs for different incidence angles, and characterizing the fracture orientations in the orthorhombic adjacent layers based on the phases of $2^{nd}$ and $4^{th}$ azimuthal FCs, for a drilling and/or fracking plan.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places is not necessarily referring to the same embodiment. Further, the particular features, structures or characteristics may be combined in any suitable manner in one or more embodiments.

Embodiments described hereinafter obtain fracture orientation characterization using seismic data. More specifically, this approach uses the phase of azimuthal FCs to characterize a change of fracture orientation between two adjacent orthorhombic layers (each with substantial parallel vertical fractures embedded in a transverse isotropic media, but their parallel fractures having different symmetry axes).

Figure 2:
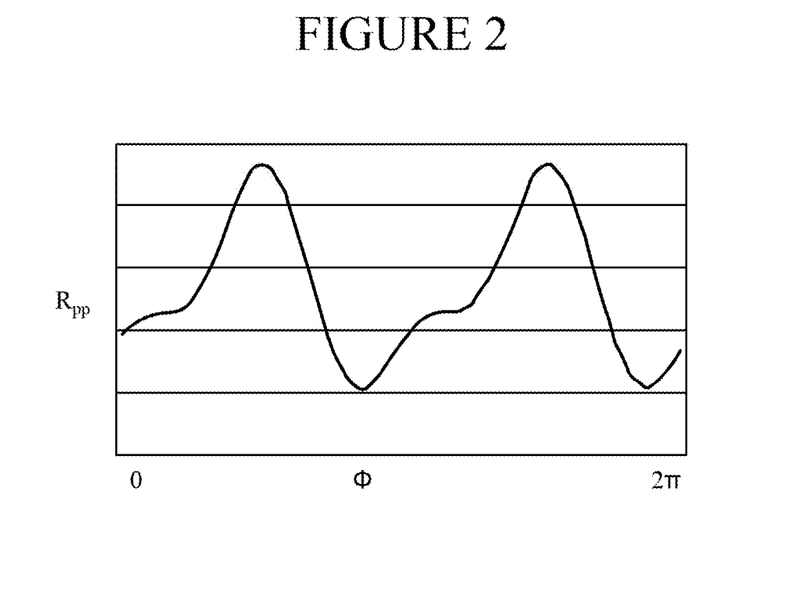
FIG. 2 is a graph of reflectivity at an interface between two orthorhombic layers with fractures having different symmetry axes as a function of azimuth in a horizontal plane.
Figure 3:
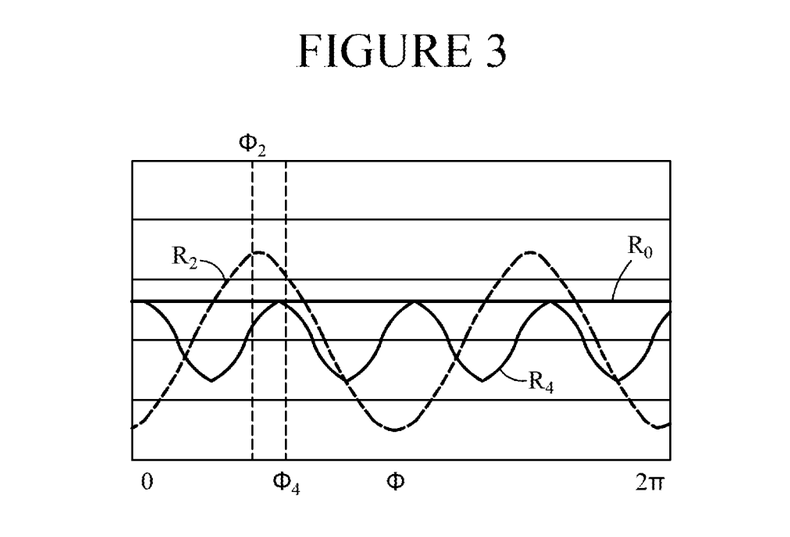
FIG. 3 illustrates Fourier components of reflectivity for a fixed incidence angle.

Considering two adjacent orthorhombic layers as illustrated in FIG. 1, the reflectivity $R_{pp}$ varies with azimuth $\phi$ at this interface as illustrated in FIG. 2, exhibiting peaks and troughs. Reflectivity may be decomposed in a Fourier series $$R(\Phi, \theta) = \sum_{n=0}^{N}(u_n(\theta)\cos(n\Phi) + v_n(\theta)\sin(n\Phi)). \quad (1)$$

that can be rewritten and simplified by retaining only dominant terms as $$R(\Phi,\theta) = r_0(\theta) + r_2(\theta)\cos 2(\Phi - \Phi_2(\theta)) r_4(\theta) \cos 4(\Phi - \Phi_4(\theta)) \quad (2)$$

where $\theta$ is the incidence angle in the vertical plane at the reflection/refraction point of the interface and $\Phi$ is the azimuth angle in a horizontal plane at the reflection/refraction point of the interface. FIG. 3 illustrates Fourier components of reflectivity $R_0$, $R_2$ and $R_4$ for a fixed value of the incident angle, that is: $R_0 = r_0$; $R_2(\Phi) = r_2 \cos 2(\Phi - \Phi_2)$; and $R_4(\Phi) = r_4 \cos 4(\Phi - \Phi_4)$.

Evaluating anisotropy has lately been included in most workflows for seismic processing and reservoir characterization. The gain over workflows considering media isotropic is undeniable but the increased complexity associated with taking into consideration anisotropy remains a challenge. Lowering the symmetry of the anisotropy from transverse isotropic (TI) to orthorhombic to monoclinic implies increasing the number of parameters. Therefore, simplifying the problem by reducing the dimensionality of the parameterization is important.

A powerful tool to simplify the complexity of anisotropic reflection coefficients are azimuthal Fourier coefficients, FC, (described, e.g., in "Amplitude variations with azimuths (AVAZ) inversion based on Linearized inversion of common azimuthal sections" by L. Ikelle, included in "Seismic Anisotropy" edited by E. Fjr et al., SEG 1996, pp. 601-644; the 2001 article "Azimuth-dependent AVO in reservoirs containing non-orthogonal fracture sets" by Sayers, C. and Dean, S. published in *Geophysical Prospecting*, No. 49, pp. 100-106; and the article "Azimuthal Fourier Coefficients" by Downton, J., Roure, B. and Hunt, L. published in *CSEG Reporter* of December 2011, pp. 22-36, all of which are incorporated herewith by reference in their entirety). In the 2015 article "Interpreting azimuthal FCs for anisotropic and fracture parameters" by Downton, J. and Roure, B. published in Interpretation of August 2015, pp. ST9-ST27 (incorporated herewith by reference in its entirety), it is shown that azimuthal FCs allow decoupling anisotropic reflection coefficients into sub-problems associated with different types of anisotropy, hence reducing cross-talk between parameters.

Sayers and Dean' article (already specified) interprets the phase of FC for monoclinic anisotropy in terms of linear slip theory thereby enabling to relate changes of phase to differences of compliance ratio between the various fracture sets. The issue is relating phases of FCs to fracture orientations and vice versa.

Figure 4:
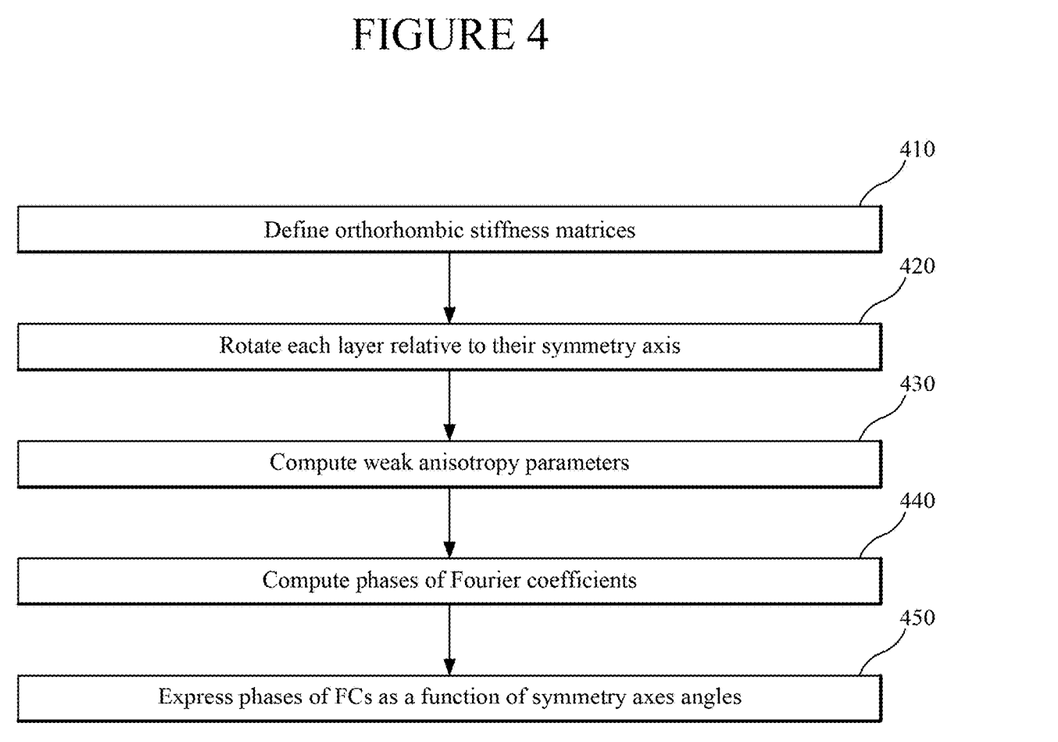
FIG. 4 illustrates the steps in relating phases of FCs to fracture orientations.

FIG. 4 illustrates the steps in establishing the theoretical basis of relating phases of FCs to fracture orientations. At 410, the orthorhombic stiffness matrices are defined for both top and bottom layers. As shown in the 1997 article "Orthorhombic media: Modeling elastic wave behavior in a vertically fractured earth" by Schoenberg, M. and Helbig, K., published in *Geophysics*, Vol. 62, No. 6, pp. 1954-1974 (which is incorporated herewith by reference in its entirety), a density-normalized stiffness matrix for a single set of parallel vertical fractures perpendicular to the x-axis in a background transverse isotropic (TI) media is given by $$a = \begin{pmatrix} a_{11} & a_{12} & a_{13} & & & \\ & a_{22} & a_{23} & & & \\ & & a_{33} & & & \\ & & & a_{44} & & \\ & & & & a_{55} & \\ & & & & & a_{66} \end{pmatrix} \quad (4)$$

which matrix relates the six independent components of the strain tensor to the independent components of the stress tensor.

Initially, the horizontal symmetry axis is chosen along the x-axis. In order to consider the actual orientation of the symmetry axis for each layer (i.e., $\phi^{(1)}$ for the top and $\phi^{(2)}$ for the bottom layer as illustrated in FIG. 1), each density-normalized stiffness matrix is rotated relative to its symmetry axis using a Bond transformation at step 420. Bond transformation, which is described in the 1990 article "Velocity anisotropy terminology for geophysicists" by Winterstein, D. F., published in *Geophysics*, Vol. 55, No. 8, pp. 1070-1088 (incorporated herewith by reference in its entirety), is a counter-clockwise rotation about the z-axis yielding 6×6 matrices a' for each layer with the following non-zero elements (in the following formula $\phi$ is $\phi^{(1)}$ or $\phi^{(2)}$ as appropriate):

$$a'_{33} = a_{33} \quad (5)$$

$$a'_{11}\left(a_{66} + \frac{1}{2}a_{12}\right)\sin^2 2\Phi + a_{11}\cos^4\Phi + a_{22}\sin^4\Phi$$

$$a'_{12} = \frac{1}{4}(-4a_{66} + a_{11} + a_{22})\sin^2 2\Phi + a_{12}(\cos^4\Phi + \sin^4\Phi)$$

$$a'_{22} = \left(a_{66} + \frac{1}{2}a_{12}\right)\sin^2 2\Phi + a_{22}\cos^4\Phi + a_{11}\sin^4\Phi$$

$$a'_{16} = -\frac{1}{2}a_{66}\sin 4\Phi + \frac{1}{2}a_{11}\sin 2\Phi\cos^2\Phi - \frac{1}{2}a_{22}\sin 2\Phi\sin^2\Phi - \frac{1}{2}a_{12}\sin^2 2\Phi$$

$$a'_{26} = \frac{1}{2}a_{66}\sin 4\Phi + \frac{1}{2}a_{11}\sin 2\Phi\sin^2\Phi - \frac{1}{2}a_{22}\sin\Phi\cos^2\Phi + \frac{1}{2}\sin^2 2\Phi$$

$$a'_{66} = a_{66}\cos^2 2\Phi + \frac{1}{4}(a_{11} + a_{22} - 2a_{12})\sin^2 2\Phi$$

$$a'_{13} = a_{13}\cos^2\Phi + a_{23}\sin^2\Phi$$

$$a'_{23} = a_{23}\cos^2\Phi + a_{13}\sin^2\Phi$$

$$a'_{44} = a_{44}\cos^2\Phi + a_{55}\sin^2\Phi$$

$$a'_{55} = a_{55}\cos^2\Phi + a_{44}\sin^2\Phi$$

$$a'_{36} = \frac{1}{2}(a_{13} - a_{23})\sin 2\Phi$$

$$a'_{45} = \frac{1}{2}(a_{55} - a_{44})\sin 2\Phi$$

Then, at 430, the weak anisotropy parameters and their contrasts for general anisotropy are calculated in the manner introduced in the 1998 article "Polarization, phase velocity, and NMO velocity of qP-waves in arbitrary weakly anisotropic media" by Pšenčík, I. and Gajewski, D., published in *Geophysics*, Vol. 63, No. 5, pp. 1754-1766, and the 2001 article "Properties of weak contrast PP reflection/transmission coefficients for weakly anisotropic elastic media" by Pšenčík, I. and Martins, J. L., published in *Studia Geophysica et Geodaetica*, No. 45, pp. 176-199 (which are incorporated herewith by reference in their entirety). The weak anisotropy parameters for both layers are:

(6)

$$\begin{cases} \varepsilon_x = \frac{a'_{11} - \alpha^2}{2\alpha^2}, \varepsilon_y = \frac{a'_{22} - \alpha^2}{2\alpha^2}, \varepsilon_z = \frac{a'_{33} - \alpha^2}{2\alpha^2} \\ \delta_x = \frac{a'_{13} + 2a'_{55} - \alpha^2}{\alpha^2}, \delta_y = \frac{a'_{23} + 2a'_{44} - \alpha^2}{\alpha^2}, \delta_z = \frac{a'_{12} + 2a'_{66} - \alpha^2}{\alpha^2} \\ \chi_x = \frac{a'_{14} + 2a'_{56}}{\alpha^2}, \chi_y = \frac{a'_{25} + 2a'_{46}}{\alpha^2}, \chi_z = \frac{a'_{36} + 2a'_{45}}{\alpha^2} \\ \varepsilon_{15} = \frac{a'_{15}}{\alpha^2}, \varepsilon_{16} = \frac{a'_{16}}{\alpha^2}, \varepsilon_{24} = \frac{a'_{24}}{\alpha^2}, \varepsilon_{26} = \frac{a'_{26}}{\alpha^2}, \varepsilon_{34} = \frac{a'_{34}}{\alpha^2}, \varepsilon_{35} = \frac{a'_{35}}{\alpha^2} \\ \gamma_x = \frac{a'_{55} - \beta^2}{2\beta^2}, \gamma_y = \frac{a'_{44} - \beta^2}{2\beta^2}, \varepsilon_{45} = \frac{a'_{45}}{\alpha^2} \end{cases}$$

where $\alpha$ and $\beta$ are the reference P-wave and S-wave velocities, respectively. The parameter contrasts are then:

$$\begin{cases} \Delta\varepsilon_x = \varepsilon_x^{(2)} - \varepsilon_x^{(1)}, \Delta\varepsilon_y = \varepsilon_y^{(2)} - \varepsilon_y^{(1)}, \Delta\varepsilon_z = \varepsilon_z^{(2)} - \varepsilon_z^{(1)} \\ \Delta\delta_x = \delta_x^{(2)} - \delta_x^{(1)}, \Delta\delta_y = \delta_y^{(2)} - \delta_y^{(1)}, \Delta\delta_z = \delta_z^{(2)} - \delta_z^{(1)} \\ \Delta\gamma_x = \gamma_x^{(2)} - \gamma_x^{(1)}, \Delta\gamma_y = \gamma_y^{(2)} - \gamma_y^{(1)}, \Delta\chi_z = \chi_z^{(2)} - \chi_z^{(1)} \\ \Delta\varepsilon_{16} = \varepsilon_{16}^{(2)} - \varepsilon_{16}^{(1)}, \Delta\varepsilon_{26} = \varepsilon_{26}^{(2)} - \varepsilon_{26}^{(1)}, \Delta\varepsilon_{45} = \varepsilon_{45}^{(2)} - \varepsilon_{45}^{(1)} \end{cases} \quad (7)$$

where the upper scripts (1) and (2) refer to the top and bottom layers, respectively.

Further, at 440, FCs are calculated using the weak anisotropy contrasts as follows (see formulas in the 2015 article by Downton):

$$\begin{cases} B_{C2} = \frac{1}{4}(\Delta\delta_x - \Delta\delta_y) - 2\bar{g}(\Delta\gamma_x - \Delta\gamma_y) \\ B_{S2} = \frac{1}{2}(\Delta\chi_z - 4\bar{g}\Delta\varepsilon_{45}) \\ C_{C2} = \frac{1}{4}(\Delta\varepsilon_x - \Delta\varepsilon_y) \\ C_{S2} = \frac{1}{4}(\Delta\varepsilon_{16} + \Delta\varepsilon_{26}) \\ C_{C4} = \frac{1}{16}(\Delta\varepsilon_x + \Delta\varepsilon_y - \Delta\delta_z) \\ C_{S4} = \frac{1}{8}(\Delta\varepsilon_{16} - \Delta\varepsilon_{26}) \end{cases} \quad (8)$$

where $g=\beta^2/\alpha^2$ and the overbar indicates average of the properties across the interface. The FCs for a given incidence angle $\theta$ are then:

$$\begin{cases} u_2 = (B_{C2} + C_{C2}\tan^2\theta)\sin^2\theta \\ v_2 = (B_{S2} + C_{S2}\tan^2\theta)\sin^2\theta \\ u_4 = C_{C4}\sin^2\theta\tan^2\theta \\ v_4 = C_{S4}\sin^2\theta\tan^2\theta \end{cases} \quad (9)$$

the FCs phases are then defined as:

$$\begin{cases} \phi_2 = \frac{1}{2}\arctan\left(\frac{v_2}{u_2}\right) \\ \phi_4 = \frac{1}{4}\arctan\left(\frac{v_4}{u_4}\right) \end{cases} \quad (10)$$

At 450, the phases of the $2^{nd}$ and the $4^{th}$ FCs are expressed as function or the symmetry axes angles $\phi^{(1)}$ and $\phi^{(2)}$. By replacing formula (9) into (10), the following equations are obtained for the phases of the $2^{nd}$ and the $4^{th}$ FCs:

$$\begin{cases} \phi_2 = \frac{1}{2}\arctan\left(\frac{(B_{S2} + \tan^2\theta\, C_{S2})\sin^2\theta}{(B_{C2} + \tan^2\theta\, C_{C2})\sin^2\theta}\right) = \frac{1}{2}\arctan\left(\frac{C_{S2}}{C_{C2}}\left(\frac{B_{S2}/C_{S2} + \tan^2\theta}{B_{C2}/C_{C2} + \tan^2\theta}\right)\right) \\ \phi_4 = \frac{1}{4}\arctan\left(\frac{C_{S4}\sin^2\theta \tan^2\theta}{C_{C4}\sin^2\theta \tan^2\theta}\right) = \frac{1}{4}\arctan\left(\frac{C_{S4}}{C_{C4}}\right) \end{cases} \quad (11)$$

The phase of the $2^{nd}$ FC varies with the incidence angle, whereas the phase of the $4^{th}$ FC does not. In the special case where $B_{S2}/C_{S2}=B_{C2}/C_{C2}$, the $2^{nd}$ FC loses its incidence angle dependency too. If formulas (5) to (11) are combined, the phases of the $2^{nd}$ and the $4^{th}$ FCs can be expressed directly as functions of the orthorhombic media parameters and their horizontal symmetry axes angles $\phi^{(i)}$:

$$\phi_2 = \frac{1}{2}\arctan\left(\frac{(X^{(2)} + Y^{(2)}\tan^2\theta)\sin 2\phi^{(2)} - (X^{(1)} + Y^{(1)}\tan^2\theta)\sin 2\phi^{(1)}}{(X^{(2)} + Y^{(2)}\tan^2\theta)\cos 2\phi^{(2)} - (X^{(1)} + Y^{(1)}\tan^2\theta)\cos 2\phi^{(1)}}\right) \quad (12)$$

and $$\phi_4 = \frac{1}{4}\arctan\left(\frac{Z^{(2)}\sin 4\phi^{(2)} - Z^{(1)}\sin 4\phi^{(1)}}{Z^{(2)}\cos 4\phi^{(2)} - Z^{(1)}\cos 4\phi^{(1)}}\right). \quad (13)$$

where $$\begin{cases} X^{(i)} = \frac{1}{4}\frac{a_{13}^{(i)} - a_{23}^{(i)}}{\alpha^{(i)2}} + \frac{1}{2}(a_{55}^{(i)} - a_{44}^{(i)})\left(\frac{1}{\alpha^{(i)2}} - \frac{2g}{\beta^{(i)2}}\right) \\ Y^{(i)} = \frac{1}{8}\frac{a_{11}^{(i)} - a_{22}^{(i)}}{\alpha^{(i)2}} \\ Z^{(i)} = \frac{1}{16}\frac{1}{\alpha^{(i)2}}\left(\frac{1}{2}(a_{11}^{(i)} + a_{22}^{(i)}) - a_{12}^{(i)} - 2a_{66}^{(i)}\right) \end{cases} \quad (14)$$

For orthorhombic media, $X^{(i)}$, $Y^{(i)}$ and $Z^{(i)}$ are typically non-zero. The phase of the $2^{nd}$ FC does not depend on the incidence angle if equations (16) using notations (15) are satisfied:

$$\begin{cases} B_{C2} = X^{(2)}\cos 2\phi^{(2)} - X^{(1)}\cos 2\phi^{(1)} \\ B_{S2} = X^{(2)}\sin 2\phi^{(2)} - X^{(1)}\sin 2\phi^{(1)} \\ C_{C2} = Y^{(2)}\cos 2\phi^{(2)} - Y^{(1)}\cos 2\phi^{(1)} \\ C_{S2} = Y^{(2)}\sin 2\phi^{(2)} - Y^{(1)}\sin 2\phi^{(1)} \\ C_{C4} = Z^{(2)}\cos 4\phi^{(2)} - Z^{(1)}\cos 4\phi^{(1)} \\ C_{S4} = Z^{(2)}\sin 4\phi^{(2)} - Z^{(1)}\sin 4\phi^{(1)} \end{cases} \quad (15)$$

$$\frac{B_{S2}}{C_{S2}} = \frac{B_{C2}}{C_{C2}} \Leftrightarrow \frac{X^{(2)}\sin 2\phi^{(2)} - X^{(1)}\sin 2\phi^{(1)}}{Y^{(2)}\sin 2\phi^{(2)} - Y^{(1)}\sin 2\phi^{(1)}} = \frac{X^{(2)}\cos 2\phi^{(2)} - X^{(1)}\cos 2\phi^{(1)}}{Y^{(2)}\cos 2\phi^{(2)} - Y^{(1)}\cos 2\phi^{(1)}}. \quad (16)$$

Figure 5:
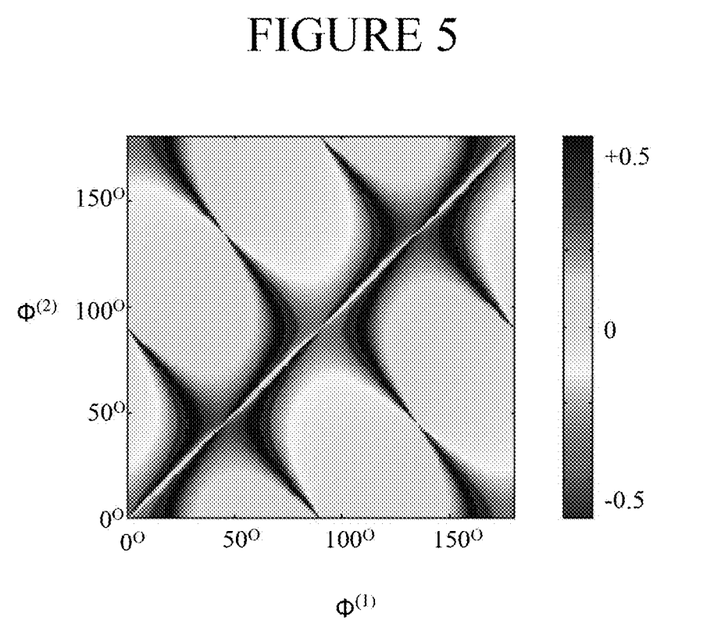
FIGS. 5 and 6 are graphical solutions for fracture orientations.
Figure 6:
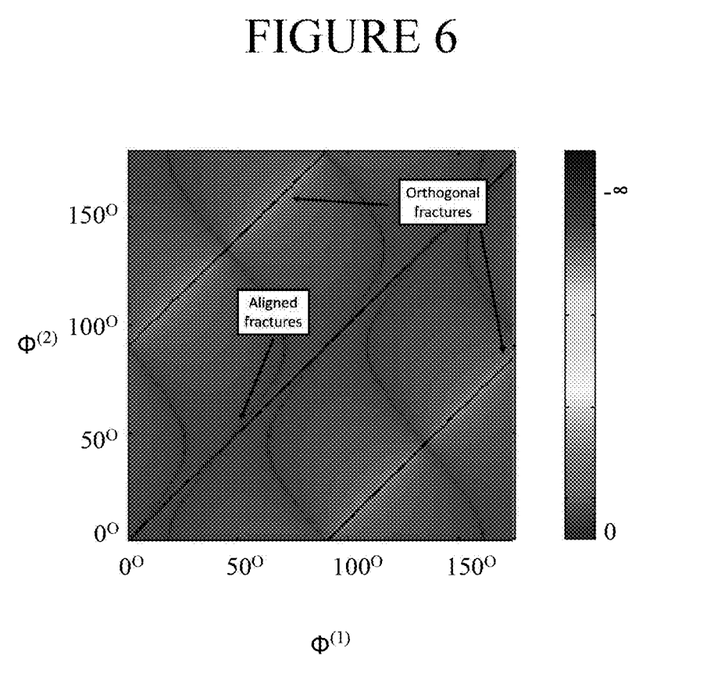

The symmetry axes $\phi^{(1)}$ and $\phi^{(2)}$ that solve equation (16) are sought for known values of $X^{(i)}$, $Y^{(i)}$ and $Z^{(i)}$ (i=1, 2). FIGS. 5 and 6 represent equation (16) in nuances of gray with $\phi^{(1)}$ and $\phi^{(2)}$ along the axes. FIG. 5 is a linear scale and FIG. 6 a logarithmic scale making particular solutions more visible, such as when fractures on top and bottom layers are aligned and when they are orthogonal.

Thus, if the fractures on the top and the bottom layers are aligned, that is, $\phi^{(1)}=\phi^{(2)}$ then $$\begin{cases} \frac{B_{S2}}{C_{S2}} = \frac{X^{(2)} - X^{(1)}}{Y^{(2)} - Y^{(1)}} \\ \frac{B_{C2}}{C_{C2}} = \frac{X^{(2)} - X^{(1)}}{Y^{(2)} - Y^{(1)}} \end{cases}. \quad (17)$$

If the fractures on the top layer are orthogonal on the ones in the bottom layer, i.e., $\phi^{(1)}=\phi^{(2)}+90°$, then $$\begin{cases} \frac{B_{S2}}{C_{S2}} = \frac{X^{(2)} + X^{(1)}}{Y^{(2)} + Y^{(1)}} \\ \frac{B_{C2}}{C_{C2}} = \frac{X^{(2)} + X^{(1)}}{Y^{(2)} + Y^{(1)}} \end{cases}. \quad (18)$$

Both in the case of aligned and in the case of orthogonal fractures, equation (11) becomes $$\begin{cases} \phi_2 = \frac{1}{2}\arctan\left(\frac{C_{S2}}{C_{C2}}\right) \\ \phi_4 = \frac{1}{4}\arctan\left(\frac{C_{S4}}{C_{C4}}\right) \end{cases}. \quad (19)$$

If $C_{S2}=C_{C2}=0$, then the phase of the $2^{nd}$ FC no longer depends on the incidence angle, that is:

$$\begin{cases} \phi_2 = \frac{1}{2}\arctan\left(\frac{B_{S2}}{B_{C2}}\right) \\ \phi_4 = \frac{1}{4}\arctan\left(\frac{C_{S4}}{C_{C4}}\right) \end{cases}. \quad (20)$$

If, besides $C_{S2}=C_{C2}=0$, the fractures are aligned or orthogonal, then $\phi_2=\phi_4=\phi^{(2)}$.

Figure 7:
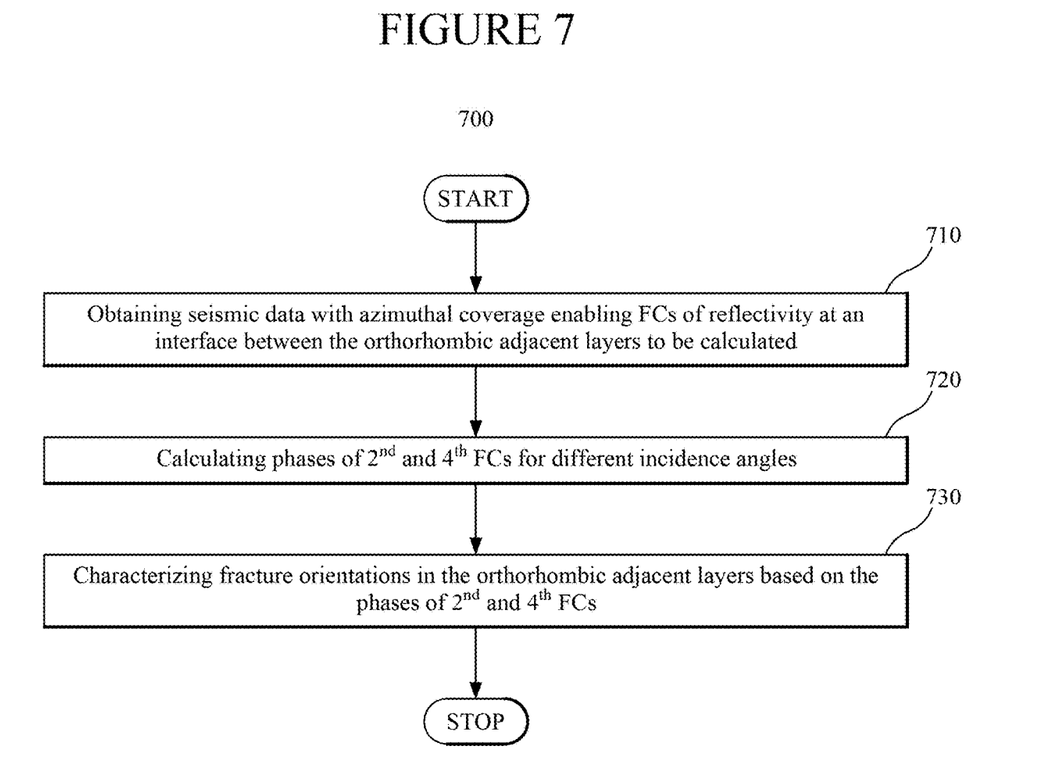
FIG. 7 is a flowchart of a method according to an embodiment.
Figure 8:
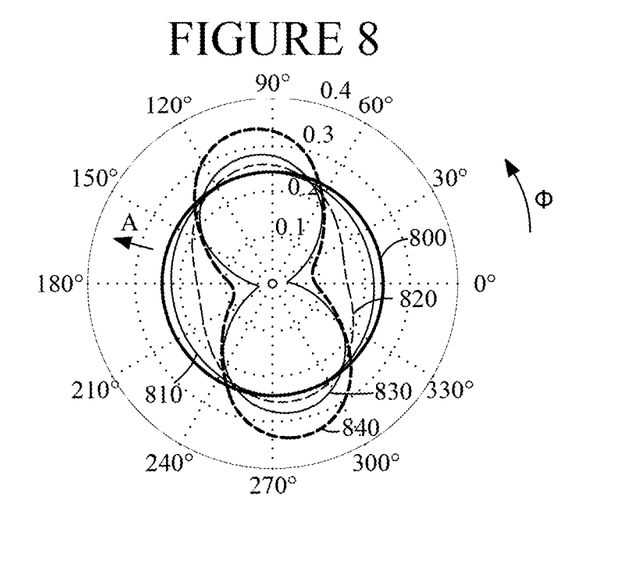
FIG. 8 illustrates amplitude-versus-azimuth data usable to calculate FCs.

In view of these formulas, FIG. 7 is a flowchart of a method 700 for characterizing fracture orientations in orthorhombic adjacent layers according to an embodiment. Method 700 includes obtaining seismic data with azimuthal coverage enabling calculating FCs at 710. For example, seismic data may be azimuthal angle stacks or any other processed land or marine data allowing the computation of FCs. FIG. 8 illustrates amplitude-versus-azimuth data usable to calculate FCs for incidence angles 0°, 10°, 20°, 30° and 40°; that is, curves 800, 810, 820, 830 and 840, respectively. In FIG. 8, the circles mark amplitude magnitudes of 0.1, 0.2, etc. and data azimuth 0.1) (e.g., between source and receiver) varies counterclockwise as marked on the circumference.

Figure 9:
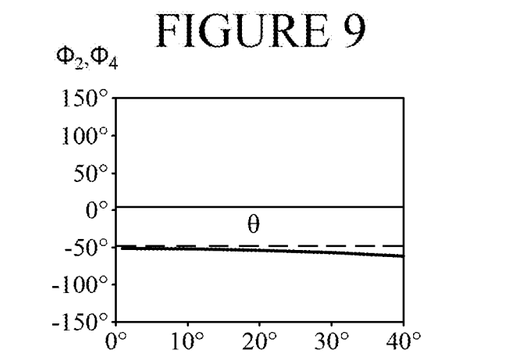
FIG. 9 is a graph illustrating phases of the $2^{nd}$ FC and of the $4^{th}$ FC as a function of the incidence angle for two orthorhombic layers not having their respective fractures aligned.
Figure 10:
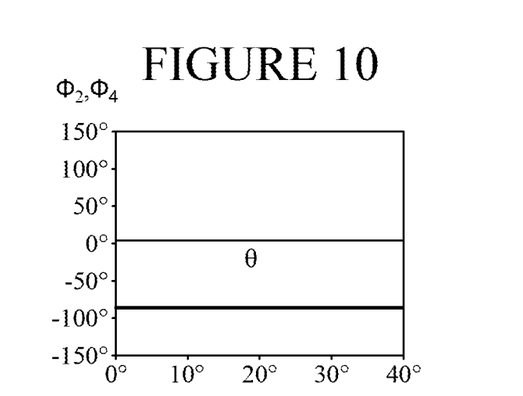
FIG. 10 is a graph illustrating phases of the $2^{nd}$ FC and of the $4^{th}$ FC as a function of the incidence angle for two orthorhombic layers with their respective fractures aligned.

Thus, the FCs and their phases are calculated at 720. FIGS. 9 and 10 are graphs illustrating phases of the $2^{nd}$ FC (the continuous line) and of the $4^{th}$ FC as functions of the incidence angle. The fractures in the two orthorhombic media for which phases of the FCs are shown in FIG. 9 are not aligned, while the fractures in the two orthorhombic media for which phases of the FCs are shown in FIG. 10 are aligned. Thus, when the fractures are aligned, the phase of the 2$^{nd}$ FC no longer depends on the incident angle and it is equal to the phase of the 4$^{th}$ FC and the fracture orientation in both layers.

Returning now to FIG. 7, at 730, the fracture orientations in the orthorhombic adjacent layers are characterized based on the phases of the 2$^{nd}$ and 4$^{th}$ FCs. This characterization can be approached from different points of view.

One way to approach this characterization is by using a signal interpretation of the phases. Based on the harmonic addition theorem, the phase of an FC is the phase of the sum of two signals whose respective phases are the symmetry axes of the two orthorhombic layers. The phase of the 2$^{nd}$ FC is the phase of a signal $S_2$ that is a sum of signals $S_2^{(1)}$ and $S_2^{(2)}$ as follows:

$$\begin{cases} S_2^{(1)}(\phi) = -(X^{(1)} + Y^{(1)}\tan^2\theta)\sin2(\phi - \phi^{(1)}) \\ S_2^{(2)}(\phi) = (X^{(2)} + Y^{(2)}\tan^2\theta)\sin2(\phi - \phi^{(2)}) \\ S_2(\phi) = S_2^{(1)}(\phi) + S_2^{(2)}(\phi) = Y\sin2(\phi - \phi_2) \end{cases} \quad (21)$$

where $$Y^2 = (X^{(1)}+Y^{(1)}\tan^2\theta)^2 + (X^{(2)}+Y^{(2)}\tan^2\theta)^2 - 2(X^{(1)}+Y^{(1)}\tan^2\theta)\ldots(X^{(2)}+Y^{(2)}\tan^2\theta)\cos 2(\phi^{(2)}-\phi^{(1)}).$$

Figure 11:
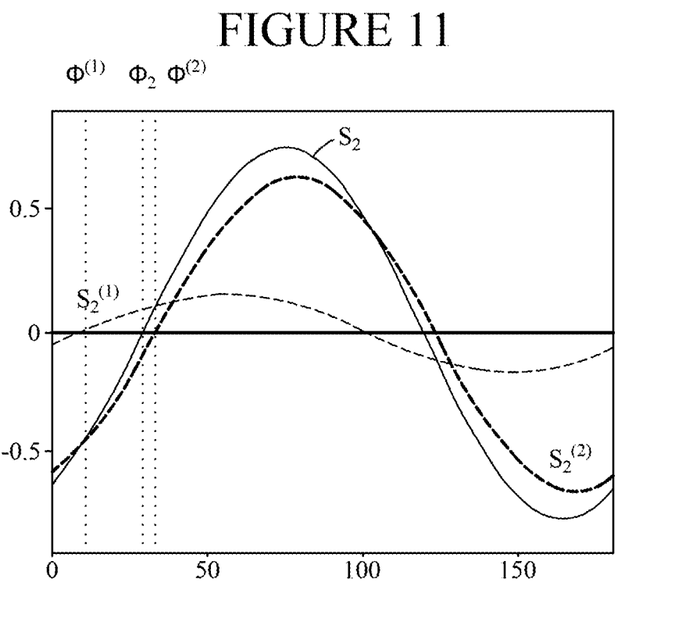
FIG. 11 illustrates harmonic addition for the phase of the $2^{nd}$ FC.

FIG. 11 illustrates these signals as functions of azimuth $\phi$. The intersections of $S_2^{(1)}$, $S_2$ and $S_2^{(2)}$ with the x axis yield $\phi^{(1)}$, $\phi_2$ and $\phi^{(2)}$, respectively.

Similarly, the phase of the 4$^{th}$ FC is the phase of a signal $S_4$ that is a sum of signals $S_4^{(1)}$ and $S_4^{(2)}$ as follows:

$$\begin{cases} S_4^{(1)}(\phi) = -Z^{(1)}\sin4(\phi - \phi^{(1)}) \\ S_4^{(2)}(\phi) = Z^{(2)}\sin4(\phi - \phi^{(2)}) \\ S_4(\phi) = S_4^{(1)}(\phi) + S_4^{(2)}(\phi) = Z\sin4(\phi - \phi_4) \end{cases} \quad (22)$$

where $$Z^2 = Z^{(1)2} + Z^{(2)2} - 2Z^{(1)}Z^{(2)} \cos 4(\phi^{(2)}-\phi^{(1)}).$$

Figure 12:
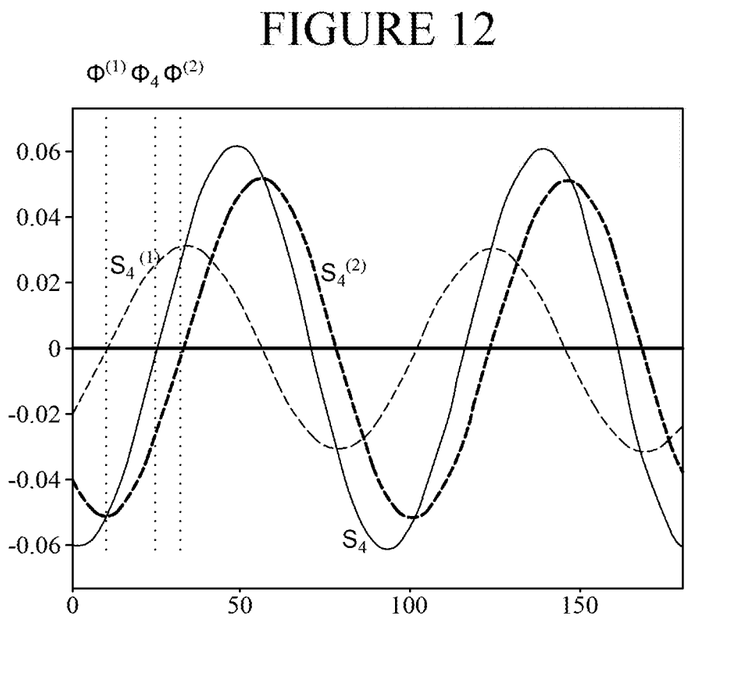
FIG. 12 illustrates harmonic addition for the phase of the $4^{th}$ FC.

FIG. 12 illustrates $S_4^{(1)}$, $S_4$ and $S_4^{(2)}$ as functions of azimuth $\phi$. The intersections of $S_4^{(1)}$, $S_4$ and $S_4^{(2)}$ with the x axis yield $\phi^{(1)}$, $\phi_4$ and $\phi^{(2)}$, respectively.

Figure 13:
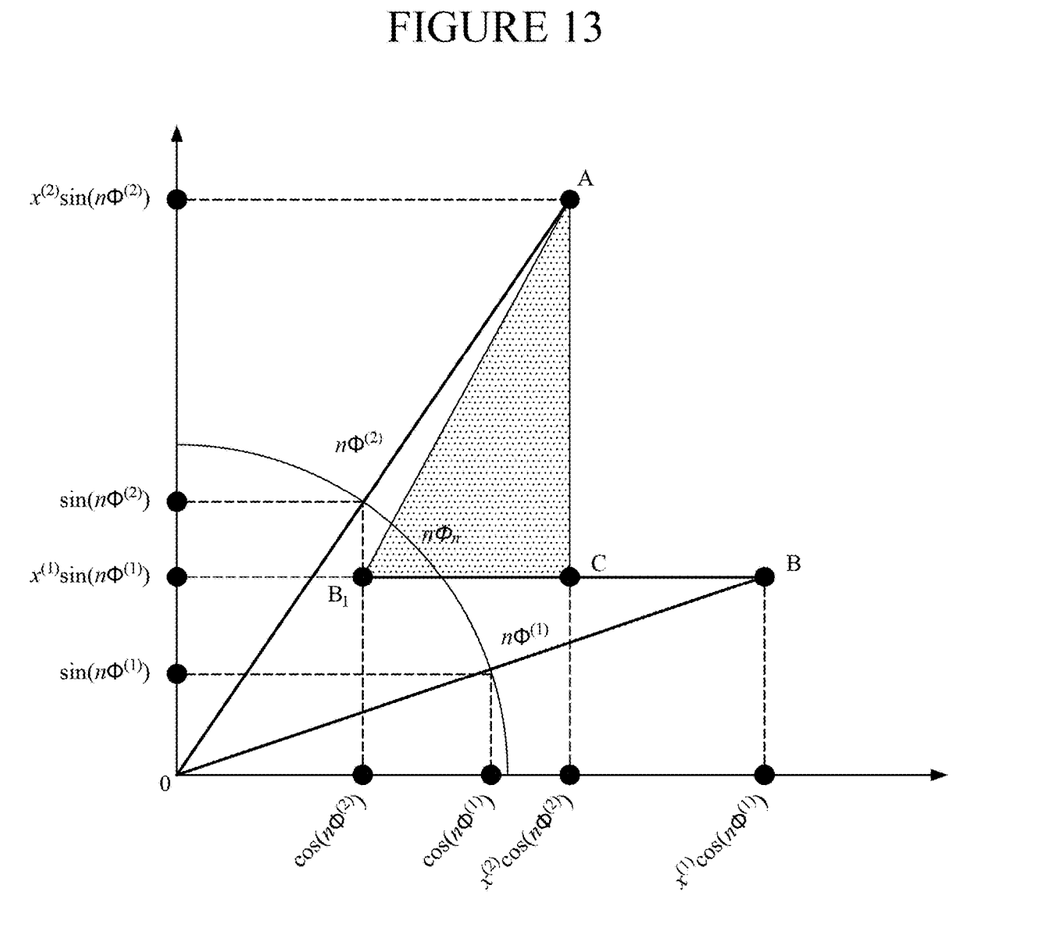
FIG. 13 is a graphic representation of phases.

Another way to relate FC phases to symmetry axes is graphically illustrated in FIG. 13. The phase of the Fourier coefficients is geometrically related to the symmetry axes, scaled by the periodicity (or order) of the Fourier coefficients and the anisotropy of each orthorhombic medium. Formulas (12) and (13) can be generically re-written as $$\tan(n\phi_n) = \frac{x^{(2)}\sin(n\phi^{(2)}) - x^{(1)}\sin(n\phi^{(1)})}{x^{(2)}\cos(n\phi^{(2)}) - x^{(1)}\cos(n\phi^{(1)})} \quad (23)$$

with n=2 or 4. Thus, on a generic circle, one starts by marking angles $n\phi^{(1)}$ and $n\phi^{(2)}$. The horizontal and vertical projections of $n\phi^{(1)}$ and $n\phi^{(2)}$ are $\sin(n\phi^{(1)})$, $\cos(n\phi^{(1)})$, $\sin(n\phi^{(2)})$ and $\cos(n\phi^{(2)})$, respectively. Then, on the y axis are drawn points corresponding to $x^{(1)}\sin(n\phi^{(1)})$ and to $x^{(2)}\sin(n\phi^{(2)})$ and on the x axis are drawn points corresponding to $x^{(1)}\cos(n\phi^{(1)})$ and to $x^{(2)}\cos(n\phi^{(2)})$. Point A of coordinates $(x^{(2)}\cos(n\phi^{(2)}), x^{(2)}\sin(n\phi^{(2)}))$ is at angle $n\phi^{(2)}$ and point B of coordinates $(x^{(1)}\cos(n\phi^{(1)}), x^{(1)}\sin(n\phi^{(1)}))$ is at angle $n\phi^{(1)}$. The difference between the projection of point A on the y axis and the projection of point B on the y axis is equal to segment CA and represents the numerator in formula (23). The difference between the projection of point A on the x axis and the projection of point B on the x axis is equal to segment $B_1C=-BC$ and represents the denominator in formula (23). Thus, angle $AB_1C$ is $n\phi_n$, its tan function being equal to formula (23).

If the symmetry axes angles and the phases of FCs are small enough (e.g., less than 30° not valid in many cases), then a first order Taylor approximation of (23) yields:

$$n\phi_n = \frac{x^{(2)}n\phi^{(2)} - x^{(1)}n\phi^{(1)}}{x^{(2)} - x^{(1)}}$$

which is equivalent with $$\phi_n = \frac{x^{(2)}\phi^{(2)} - x^{(1)}\phi^{(1)}}{x^{(2)} - x^{(1)}}. \quad (24)$$

Thus, in this case, the phases of the FCs are weighted averages of the symmetry axes angles, weighted by the anisotropy in each layer.

In the case one layer is isotropic and the other is orthorhombic, the incidence angle dependency of the phase of the 2$^{nd}$ FC is controlled by the ratios $B_{S2}/C_{S2}$ and $B_{C2}/C_{C2}$:

$$\begin{cases} \phi_2 = \frac{1}{2}\arctan\left(\frac{(B_{S2} + \tan^2\theta C_{S2})\sin^2\theta}{(B_{C2} + \tan^2\theta C_{C2})\sin^2\theta}\right) = \frac{1}{2}\arctan\left(\frac{C_{S2}}{C_{C2}}\left(\frac{B_{S2}/C_{S2} + \tan^2\theta}{B_{C2}/C_{C2} + \tan^2\theta}\right)\right) \\ \phi_4 = \frac{1}{4}\arctan\left(\frac{C_{S4}\sin^2\theta\tan^2\theta}{C_{C4}\sin^2\theta\tan^2\theta}\right) = \frac{1}{4}\arctan\left(\frac{C_{S4}}{C_{C4}}\right) \end{cases} \quad (25)$$

If one of the top or bottom layer is isotropic and the other orthorhombic, then $B_{S2}/C_{S2}=B_{C2}/C_{C2}=X^{(2)}/Y^{(2)}$ and the phase of the 2$^{nd}$ FC does not depend on the incident angle, the phases of the 2$^{nd}$ and 4$^{th}$ FCs being equal to the orthorhombic symmetry axis angle.

If there are the same properties in both layers except for the fracture orientations, then the phase of the 2$^{nd}$ FC does not depend on the incident angle. Using the properties of the inverse trigonometric functions, the phases are the average of the symmetry axes shifted by a constant:

$$\begin{cases} \phi_2 = \pm\frac{\pi}{4} + \frac{1}{2}(\phi^{(2)} + \phi^{(1)}) \\ \phi_4 = \pm\frac{\pi}{8} + \frac{1}{2}(\phi^{(2)} + \phi^{(1)}) \end{cases} \quad (26)$$

While the phase of the $4^{th}$ FC is only sensitive to the anisotropy (anellipticity) in the far angles, the phase of the $2^{nd}$ FC is sensitive to anisotropy both in the mid and far angles, giving rise to its incident angle dependency. If there is no anisotropy in the far angles (i.e., Y(i)=0) or if the anisotropy is the same in the mid and far angles (i.e. X(i)=Y(i)), then the angle dependency of the phase of the $2^{nd}$ FC disappears:

$$\phi_2 = \frac{1}{2}\arctan\left(\frac{X^{(2)}\sin 2\phi^{(2)} - X^{(1)}\sin 2\phi^{(1)}}{X^{(2)}\cos 2\phi^{(2)} - X^{(1)}\cos 2\phi^{(1)}}\right). \tag{27}$$

If the fracture orientations are 45° apart, then the phase of the $2^{nd}$ FC remains dependent on incidence angle, but the phase of the $4^{th}$ FC is equal to the symmetry axes (which are the same modulo 45°):

$$\phi_4 = \frac{1}{4}\arctan\left(\frac{Z^{(2)}\sin 4\phi^{(2)} - Z^{(1)}\sin 4\phi^{(1)}}{Z^{(2)}\cos 4\phi^{(2)} - Z^{(1)}\cos 4\phi^{(1)}}\right) \tag{28}$$

$$\phi_4 = \frac{1}{4}\arctan\left(\frac{Z^{(2)}\sin 4\phi^{(2)} - Z^{(1)}\sin 4\left(\phi^{(2)} + \frac{\pi}{4}\right)}{Z^{(2)}\cos 4\phi^{(2)} - Z^{(1)}\cos 4\left(\phi^{(2)} + \frac{\pi}{4}\right)}\right)$$

$$\phi_4 = \frac{1}{4}\arctan\left(\frac{Z^{(2)}\sin 4\phi^{(2)} - Z^{(1)}\sin(4\phi^{(2)} + \pi)}{Z^{(2)}\cos 4\phi^{(2)} - Z^{(1)}\cos(4\phi^{(2)} + \pi)}\right)$$

$$\phi_4 = \frac{1}{4}\arctan\left(\frac{Z^{(2)}\sin 4\phi^{(2)} + Z^{(1)}\sin 4\phi^{(2)}}{Z^{(2)}\cos 4\phi^{(2)} + Z^{(1)}\cos 4\phi^{(2)}}\right)$$

$$\phi_4 = \frac{1}{4}\arctan\left(\frac{\sin 4\phi^{(2)}Z^{(2)} + Z^{(1)}}{\cos 4\phi^{(2)}Z^{(2)} + Z^{(1)}}\right)$$

$$\phi_4 = \frac{1}{4}\arctan(\tan 4\phi^{(2)}) = \phi^{(2)}.$$

Figure 14:
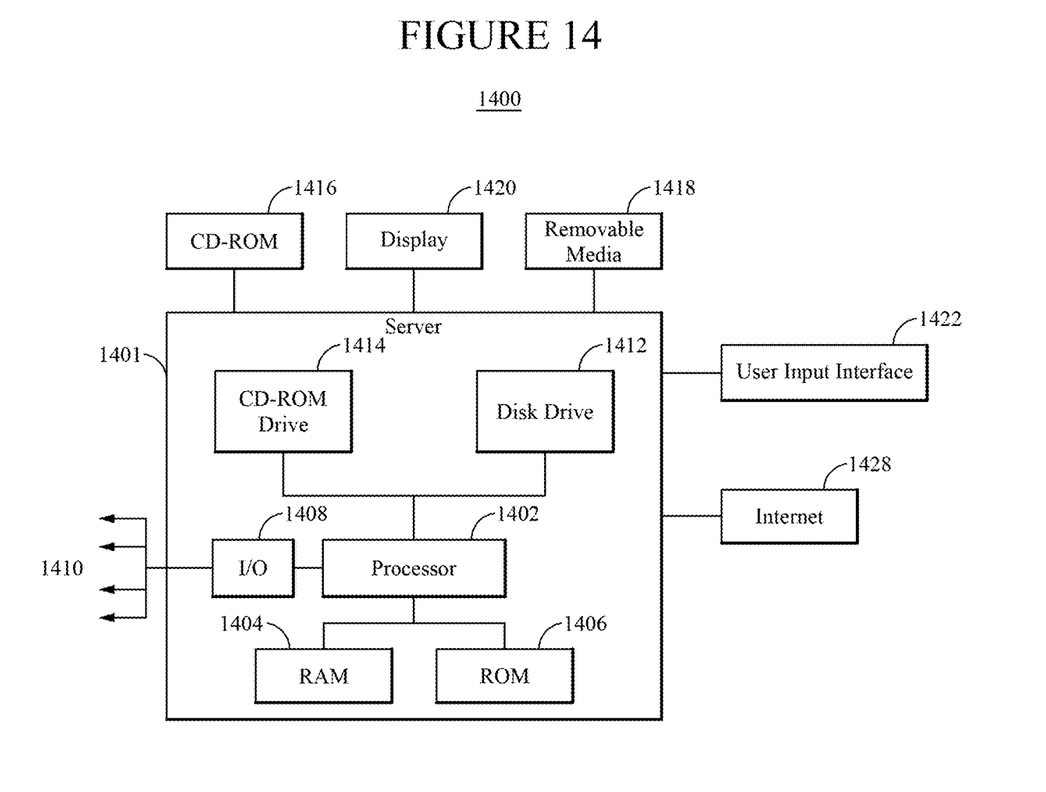
FIG. 14 is a schematic diagram of a computing device according to an embodiment.

The above-discussed methods may be implemented in a computing device 1400 as illustrated in FIG. 14. Hardware, firmware, software or a combination thereof may be used to perform the various steps and operations described herein.

Exemplary computing device 1400 suitable for performing the activities described in the exemplary embodiments may include a server 1401. Server 1401 may include a central processor (CPU) 1402 coupled to a random-access memory (RAM) 1404 and to a read-only memory (ROM) 1406. ROM 1406 may also be other types of storage media to store programs, such as programmable ROM (PROM), erasable PROM (EPROM), etc. Processor 1402 may communicate with other internal and external components through input/output (I/O) circuitry 1408 and bussing 1410 to provide control signals and the like. Processor 1402 carries out a variety of functions as are known in the art, as dictated by software and/or firmware instructions.

Server 1401 may also include one or more data storage devices, including hard drives 1412, CD-ROM drives 1414 and other hardware capable of reading and/or storing information, such as DVD, etc. In one embodiment, software for carrying out the above-discussed steps may be stored and distributed on a CD-ROM or DVD 1416, a USB storage device 1418 or other form of media capable of portably storing information. These storage media may be inserted into, and read by, devices such as CD-ROM drive 1414, disk drive 1412, etc. Server 1401 may be coupled to a display 1420, which may be any type of known display or presentation screen, such as LCD, plasma display, cathode ray tube (CRT), etc. A user input interface 1422 is provided, including one or more user interface mechanisms such as a mouse, keyboard, microphone, touchpad, touch screen, voice-recognition system, etc.

Server 1401 may be coupled to other devices, such as sources, detectors, etc. The server may be part of a larger network configuration as in a global area network (GAN) such as the internet 1428, which allows ultimate connection to various computing devices.

According to one embodiment, I/O circuitry 1408 is configured to obtain seismic data with azimuthal coverage enabling calculating FCs of reflectivity at an interface between the orthorhombic adjacent layers, and processor 1402 is configured to calculate phases of $2^{nd}$ and $4^{th}$ azimuthal FCs for different incidence angles and to characterize the fracture orientations in the orthorhombic adjacent layers based on the phases of $2^{nd}$ and $4^{th}$ azimuthal FCs, for a drilling and/or fracking plan.

In yet another embodiment, RAM 1404 stores executable codes that, when executed, make the I/O circuitry 1408 obtain seismic data with azimuthal coverage enabling calculation of FCs of reflectivity at an interface between the orthorhombic adjacent layers, and processor 1402 to calculate phases of the $2^{nd}$ and $4^{th}$ azimuthal FCs for different incidence angles and to characterize the fracture orientations in the orthorhombic adjacent layers based on the phases of the $2^{nd}$ and $4^{th}$ azimuthal FCs, for a drilling and/or fracking plan.

The disclosed embodiments provide methods and apparatuses for characterizing fracture orientations in orthorhombic adjacent layers based on azimuthal Fourier coefficients of reflectivity at an interface between the orthorhombic adjacent layers. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a general-purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic exploration method for characterizing fracture orientations in orthorhombic adjacent layers of an explored formation, the method comprising:

obtaining seismic data with azimuthal coverage enabling calculating azimuthal Fourier Coefficients, FCs, of reflectivity at an interface between the orthorhombic adjacent layers;

calculating phases of $2^{nd}$ and $4^{th}$ azimuthal FCs for different incidence angles;

characterizing the fracture orientations in the orthorhombic adjacent layers based on the phases of $2^{nd}$ and $4^{th}$ azimuthal FCs; and drilling wells or conducting hydraulic fracking in the explored formation based on the fracture orientations.

2. The method of claim 1, wherein the phases of $2^{nd}$ and $4^{th}$ azimuthal FCs indicate whether the fracture orientations in the orthorhombic adjacent layers are aligned.

3. The method of claim 1, wherein the phases of $2^{nd}$ and $4^{th}$ azimuthal FCs indicate whether the fracture orientations in the orthorhombic adjacent layers are orthogonal on each other.

4. The method of claim 1, wherein azimuth angle dependences of the phases of $2^{nd}$ and $4^{th}$ azimuthal FCs are used to infer the fracture orientations in the orthorhombic adjacent layers.

5. The method of claim 1, wherein if one of the orthorhombic adjacent layers is an isotropic layer, the phases of $2^{nd}$ and $4^{th}$ azimuthal FCs are substantially equal, independent of the incidence angle and substantially equal to an angle of a symmetry axis of other among the orthorhombic adjacent layers.

6. The method of claim 1, wherein if the orthorhombic adjacent layers have same properties except the fracture orientations, then the phases of the azimuthal FCs are averages of the fracture orientations shifted by respective constants.

7. The method of claim 1, wherein, if the fracture orientations are 45° apart, the phase of the $2^{nd}$ FC remains dependent on incidence angle but the phase of the $4^{th}$ FC is equal to symmetry axes which are same if expressed modulo 45°.

8. The method of claim 1, wherein the seismic data is made of azimuthal angle stacks for at least two incident angles.

* * * * *